United States Patent
Gutleber et al.

(10) Patent No.: US 12,497,683 B2
(45) Date of Patent: Dec. 16, 2025

(54) MATERIAL FOR THIN, SMOOTH, AND HIGH-VELOCITY FLAME SPRAYED COATINGS WITH INCREASED DEPOSITION EFFICIENCY

(71) Applicant: OERLIKON METCO (US) INC., Westbury, NY (US)

(72) Inventors: Jonathan Gutleber, Northport, NY (US); Ville Hermanni Eronen, Jyvaskyla (FI); Guido Reisel, Bad Liebenstein (DE)

(73) Assignee: OERLIKON METCO (US) INC., Westbury, NY (US)

( * ) Notice: Subject to any disclaimer, the term of this patent is extended or adjusted under 35 U.S.C. 154(b) by 0 days.

(21) Appl. No.: 18/282,353

(22) PCT Filed: May 2, 2022

(86) PCT No.: PCT/US2022/027293
§ 371 (c)(1),
(2) Date: Sep. 15, 2023

(87) PCT Pub. No.: WO2022/235570
PCT Pub. Date: Nov. 10, 2022

(65) Prior Publication Data
US 2024/0141472 A1 May 2, 2024

Related U.S. Application Data (60) Provisional application No. 63/183,293, filed on May 3, 2021.

(51) Int. Cl.
*C23C 4/12* (2016.01)
*B22F 1/00* (2022.01)
(Continued)

(52) U.S. Cl.
CPC .............. *C23C 4/129* (2016.01); *B22F 1/052* (2022.01); *B22F 1/065* (2022.01); *B22F 1/09* (2022.01);
(Continued)

(58) Field of Classification Search
None
See application file for complete search history.

(56) References Cited

U.S. PATENT DOCUMENTS

2006/0040125 A1* 2/2006 Obara ..................... C23C 4/06
428/307.3
2009/0123690 A1* 5/2009 Scholl ................. C22C 33/0207
428/97

(Continued)

FOREIGN PATENT DOCUMENTS

JP      2008050669 A   *  3/2008
WO     2021/007209         1/2021

OTHER PUBLICATIONS

English translation of JP 2008050669 (originally published Mar. 6, 2008), obtained from Espacenet.*

(Continued)

*Primary Examiner* — George Wyszomierski
(74) *Attorney, Agent, or Firm* — GREENBLUM & BERNSTEIN, P.L.C.

(57) ABSTRACT

A thermal spray material feedstock is provided for "flash-carbide" coatings. Flash carbide coatings are thin, dense, and smooth thermal spray coatings that self-activate the substrate. Flash-carbide coatings form and peen the coating to impart compressive stress for good adhesion and corrosion resistance. To achieve this combination of properties and performance, a powder that includes fine, dense, and angular particles is used; however, this powder alone results in a poor deposition efficiency of typically less than 20%. The present disclosure mitigates the poor deposition effi- (Continued)

ciency of this powder alone by providing a composition having two or more different particles at a specific ratio to improve deposition efficiency with sufficient optimized stress and corrosion properties and, in some cases, an increase in coating performance.

23 Claims, 7 Drawing Sheets

(51) Int. Cl.
  *B22F 1/052* (2022.01)
  *B22F 1/065* (2022.01)
  *B22F 1/12* (2022.01)
  *C23C 4/067* (2016.01)
  *C23C 4/129* (2016.01)

(52) U.S. Cl.
  CPC ............... *B22F 1/12* (2022.01); *C23C 4/067* (2016.01); *B22F 2302/105* (2013.01); *B22F 2302/253* (2013.01); *B22F 2304/058* (2013.01); *B22F 2304/10* (2013.01); *B22F 2999/00* (2013.01)

(56) References Cited

U.S. PATENT DOCUMENTS

| | | |
|---|---|---|
| 2012/0295825 A1 | 11/2012 | Dorfman et al. |
| 2014/0227548 A1 | 8/2014 | Myrick |
| 2014/0234609 A1 | 8/2014 | Reisel et al. |
| 2016/0243616 A1 | 8/2016 | Gries |
| 2017/0043426 A1 | 2/2017 | Fiala et al. |
| 2021/0130243 A1* | 5/2021 | Wilson .................. C04B 38/067 |
| 2022/0023944 A1* | 1/2022 | Desiles .................. B22D 19/14 |

OTHER PUBLICATIONS

Int'l Search Report (Form PCT/ISA/210) conducted in Int'l Appln. No. PCT/US2022/27293 (Jul. 28, 2022).
Int'l Written Opinion (Form PCT/ISA/237) conducted in Int'l Appln. No. PCT/US2022/27293 (Jul. 28, 2022).

* cited by examiner

MATERIAL FOR THIN, SMOOTH, AND HIGH-VELOCITY FLAME SPRAYED COATINGS WITH INCREASED DEPOSITION EFFICIENCY

CROSS-REFERENCE TO RELATED APPLICATION

This application claims the benefit and priority of U.S. Provisional Application No. 63/183,293 filed May 3, 2021, the disclosure of which is expressly incorporated by reference herein in its entirety.

BACKGROUND OF THE INVENTION

1. Field of the Disclosure

The present disclosure relates to a thermal spray material feedstock having two or more different particle types that forms a coating composition when thermally sprayed onto a substrate surface. In example embodiments, the thermal spray material feedstock improves deposition efficiency and maintains coating performance.

2. Background Information

"Flash-carbide" coatings are thin, dense, and smooth coatings that have been recently used to replace hard chrome plating as well as conventional High-Velocity Oxy-Fuel (HVOF) and High-Velocity Air-Fuel (HVAF) coatings, which require an application of grind stock for dimensional grinding and finishing. The conventional powders used for flash-carbide coatings are typically very fine (−15/+5 μm), dense, and have an angular morphology. However, these characteristics of the conventional powders result in a low deposition efficiency of approximately 20% because remaining particles in the powder that do not form the coating activate the substrate surface and peen the coating to induce compressive stress. As a result, the economy and efficiency of thermal spraying these conventional powders are poor.

Further, conventional flash carbide coatings exhibit high level of compressive stress due to the peening effect, that makes the coating denser and more resistant towards corrosive medium penetrating through the layer. To achieve high corrosion resistance both very fine particle size and high compressive stress are required. By using only different size fractions of particles having a dense, fine, and angular morphology to increase deposition efficiency, an increase in corrosion resistance is obtained due to the lower degree of melting and velocity. However, an extremely small particle size (−15/+5 μm) is required, especially for HVAF in which the flame temperature is low and full melting does not occur. Moreover, a fine grain size of the coating results in a high packing density. Furthermore, a sintered and crushed material of particles having a dense, fine, and angular morphology does not achieve both a high deposition efficiency and a high coating density.

The present disclosure provides a thermal spray material feedstock that exhibits improved deposition efficiency, while simultaneously maintaining the coating performance as compared to conventional powders.

SUMMARY

Embodiments of present disclosure provide a thermal spray material feedstock that alters the deposition dynamics of a high velocity sprayed coating by increasing the percentage of particles that form the coating for greater deposition efficiency. The deposition dynamics of the coating are altered by including two or more different particle types in the feedstock powder. The inventors of the present disclosure discovered that morphology, size, and particle strength of the two or more different particle types provide excellent peening stress, dense coating, and improved deposition efficiency.

In example embodiments, the feedstock powder includes a first powder that includes first particles having a dense (apparent density range 3-9 $g/cm^3$), fine, and angular morphology that are mixed with a second powder that includes second particles having a spheroidal morphology and a lower apparent density (1-7 $g/cm^3$) than the first particles. A mixture of these particle types achieves a higher deposition efficiency than the first particle type alone, with a minimal reduction in coating performance. Moreover, a coating obtained from thermal spraying only the second particle types does not possess the same properties or performance as example embodiments of the present disclosure.

In example embodiments, the higher density first powder includes first particles having an average measurable intra-particle porosity of 0% to 15%, preferably 0.01% to 15%, more preferably 0.01% to 10%, and most preferably 0.01% to 5%. In other embodiments, the lower density second powder includes second particles having an average measurable intra-particle porosity of 5% to 35%, preferably 10% to 30%, and more preferably 12% to 22%. The average measurable intra-particle porosity can be determined by measuring ten individual porosity measurements of ten unique powder particles cross-sections using SEM. The standard for measuring porosity within a thermal spray coating is ASTM-E2109-Standard Test Methods for Determining Area Percentage Porosity in Thermal Sprayed Coatings. The present disclosure uses a method similar to the standard for measuring porosity, except that the standard for measuring porosity captures the exterior of particles, whereas the present disclosure uses a method that captures the interior of particles from cross-sections using SEM.

In example embodiments, the first powder that includes first particles exhibits angular and irregular morphologies. As a result, the use of this powder may result in inconsistent powder feeding. In addition, the first powder particles are generally denser and harder to melt, which results in lower deposition efficiencies due to insufficient heating of the particles in the thermal spray. The resulting coatings may be lower in porosity compared to coatings made from powders with an internal porosity, such as agglomerated powders, agglomerated-and-sintered powders, and hollow oven spherical powder (HOSP).

In embodiments, the first powder that includes first particles exhibits angular and irregular morphologies. As a result, the use of this powder may result in inconsistent powder feeding. In addition, the first powder particles are generally denser and harder to melt, which results in lower deposition efficiencies due to insufficient heating of the particles in the thermal spray. The resulting coatings may be lower in porosity compared to coatings made from powders with an internal porosity, such as agglomerated powders, agglomerated-and-sintered powders, and hollow oven spherical powder (HOSP).

In example embodiments, the second powder that includes second particles having a spheroidal morphology present a low surface area, which reduces friction, improves the flowability and reduces viscosity when combining with other powder feedstock components having different morphologies.

In example embodiments, the first powder that includes first particles includes a tungsten carbide cobalt chromium (WC—CoCr) powder having a high density (apparent density range 3-9 g/cm³) that preferably is sintered and crushed. In embodiments, the first powder that includes first particles includes all carbides of elements from the periodic system of elements in groups IV, V, and VI, such as Ti, V, Cr, Zr, Nb, Mo, Hf, Ta, and W. In other embodiments, the carbides are the types of WC, TiC, $Cr_3C_2$, VC, and others in a metallic matrix with alloy compositions containing Co, Cr, Ni, Fe, Cu, and other alloying elements.

In embodiments, the first powder that includes first particles includes all borides of elements from the periodic system of elements from the periodic system of elements in groups IV, V, and VI. In other embodiments, the first powder that includes first particles includes alloyed carbides or borides of at least two elements from the periodic system of elements in groups IV, V, and VI. In an embodiment, the first powder that includes first particles includes $Al_2O_3$. In other embodiments, the first powder that includes first particles includes carbides and nitrides of Si.

In example embodiments, the carbides in the higher density first powder have a primary average carbide size greater than 1 m, preferably greater than 2 m, and more preferably greater than 2.5 μm.

In example embodiments, the second powder is a tungsten carbide cobalt chromium (WC—CoCr) powder, preferably having a lower density (1-7 g/cm³) than the first powder, and preferably is agglomerated and sintered. In example embodiments, the carbides in the lower density second powder have a primary carbide size less than 1 μm, preferably less than 0.8 μm, and more preferably less than 0.5 μm.

In embodiments, the second powder that includes second particles includes all carbides of elements from the periodic system of elements in groups IV, V, and VI, such as Ti, V, Cr, Zr, Nb, Mo, Hf, Ta, and W. In other embodiments, the carbides are the types of WC, TiC, $Cr_3C_2$, VC, and others in a metallic matrix with alloy compositions containing Co, Cr, Ni, Fe, Cu, and other alloying elements. In embodiments, the second powder that includes second particles includes all borides of elements from the periodic system of elements from the periodic system of elements in groups IV, V, and VI. In other embodiments, the second powder that includes second particles includes alloyed carbides or borides of at least two elements from the periodic system of elements in groups IV, V, and VI. In an embodiment, the second powder that includes second particles includes $Al_2O_3$. In other embodiments, the second powder that includes second particles includes carbides and nitrides of Si.

Example embodiments of the present disclosure include a thermal spray material feedstock that includes a blend ratio of about 5% to 50% of the second powder and 95% to 50% of the first powder, respectively, to increase deposition efficiency and improve coating properties, such as wear resistance, hardness, adhesion and corrosion resistance, without detrimentally impacting the compressive stress, self-blasting/activation, and low surface roughness. In other examples, the thermal spray material feedstock includes a blend ratio of about 10% to 40% of the second powder and 90% to 60% of the first powder, respectively, to balance the properties between deposition efficiency and coating performance. In yet other examples, the thermal spray material feedstock includes a blend ratio of 20% to 35% of the second powder and 80% to 65% of the first powder, respectively.

A thermal spray material feedstock can be manufactured by blending or cladding the first powder and the second powder. The coatings are formed by thermal spraying the feedstock material onto a substrate.

The blend powders in example embodiments of the present disclosure achieve a deposition efficiency of up to 50% or higher. In contrast, powders having only the first particles achieve a deposition efficiency approximately 20%. Moreover, the blend ratio in example embodiments of the present disclosure achieves coating residual stress control and improved efficiency.

The example embodiments of the present disclosure include thermal spray material powder feedstock having a blend ratio of a first powder and second powder that achieve both a high deposition efficiency and high coating density by incorporating a second powder that has better deformability (i.e., the ability to conform to the surface and between angular particle splats). In an embodiment, the second particles deform around the first particles having a dense, fine, and angular morphology during impact, and are peened by subsequent impinging angular particles that may form the coating, resulting in increased compressive stress within this material that can be controlled by altering the ratio and properties of the first and second particles.

Example embodiments include a method for manufacturing a tungsten carbide coating composition that includes thermal spraying the material feedstock of the present disclosure onto a substrate surface to form a tungsten carbide coating. In example embodiments, the thermal spraying process is HVAF or HVOF or similar high velocity thermal spray process.

BRIEF DESCRIPTION OF THE DRAWINGS

The present disclosure is further described in the detailed description which follows, in reference to the noted plurality of drawings, by way of non-limiting examples of preferred embodiments of the present disclosure.

DETAILED DESCRIPTION

Figure 1:
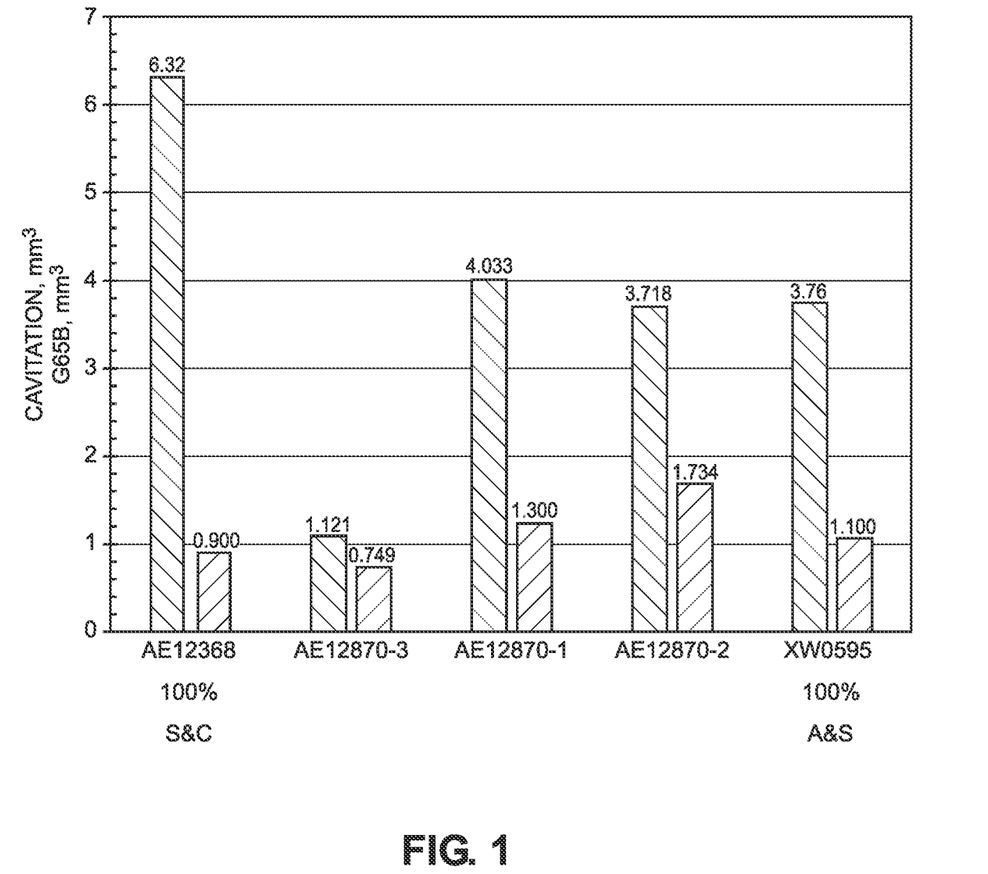
FIG. 1 shows abrasion and cavitation data for modified powders, according to various embodiments.

FIG. 1 illustrates abrasion and cavitation data for modified powders, including AE12368, AE12870-1, AE12870-2, AE12870-3, and XW0595. AE12368 is a material that includes 100% dense, angular particles that have been sintered and crushed. XW0595 is a material that includes particles that are 100% manufactured by agglomeration and sintering and have predominantly spheroidal morphology typical for particles achieved by this manufacturing method AE12870-1 and AE12870-2 are materials that include 50% and 75% blends of agglomerated and sintered particles, respectively. AE12870-3 is a material that includes a blend ratio of 25% spheroidal particles that have been agglomerated and sintered and 75% dense, fine, and angular particles that have been sintered and crushed. The results of FIG. 1 show that the AE12870-1, AE12870-2, and AE12870-3 materials and the resulting coatings perform unexpectedly better in abrasion and cavitation than either the agglomerated and sintered material (XW0595) alone or the sintered and crushed material (AE12368) alone.

Figure 2:
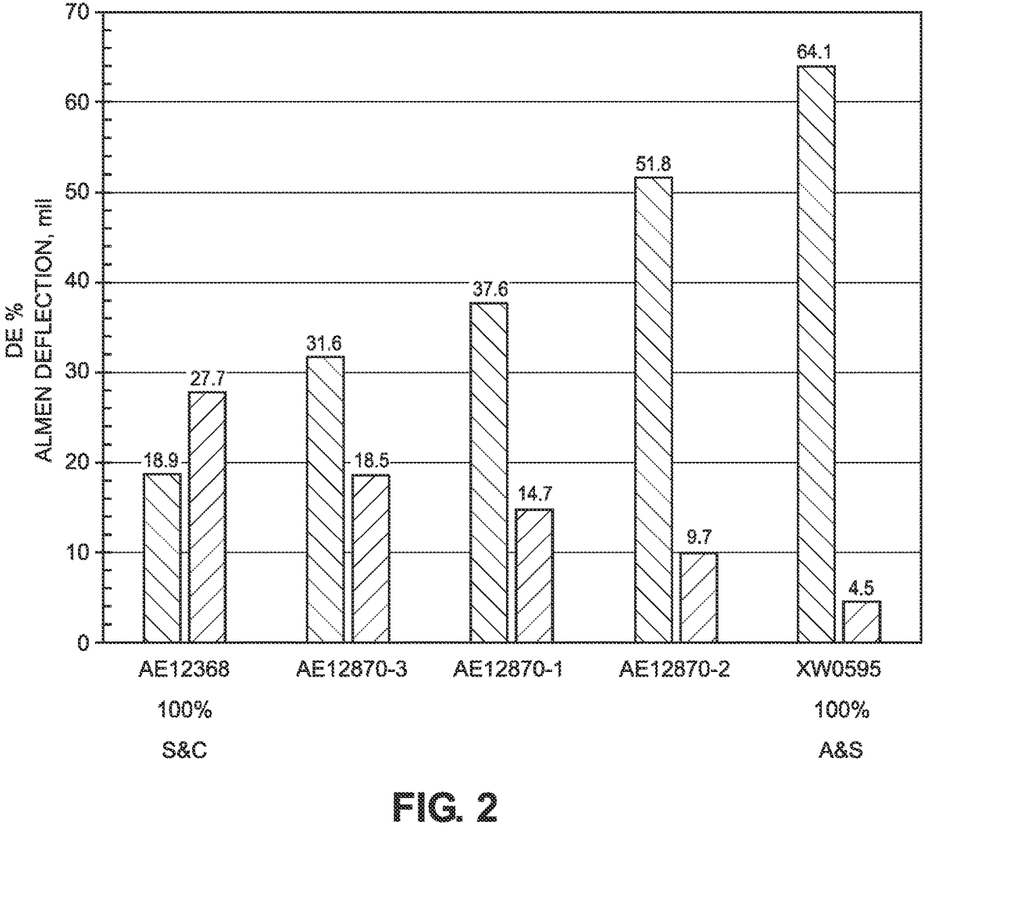
FIG. 2 shows the deposition efficiency and Almen deflection residual stress for modified powders, according to various embodiments.

FIG. 2 illustrates the deposition efficiency and Almen deflection residual stress for modified powders, including AE12368, AE12870-1, AE12870-2, AE12870-3, and XW0595. The results of FIG. 2 show that the AE12870-1, AE12870-2, and AE12870-3 materials achieve a significantly higher deposition efficiency and compressive stress as shown by Almen deflection as compared to the sintered and crushed material alone (AE12368).

Figure 3:
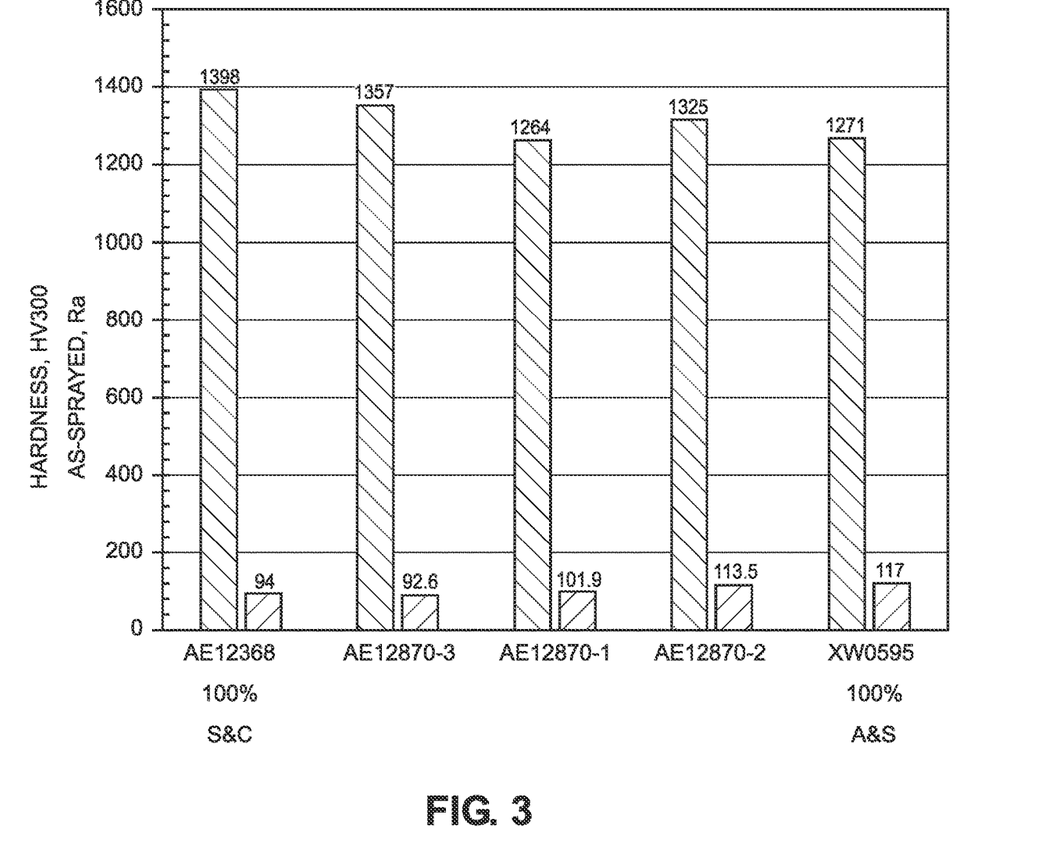
FIG. 3 shows the coating hardness and roughness for modified powders, according to various embodiments.

FIG. 3 illustrates the coating hardness and roughness for modified powders, including AE12368, AE12870-1, AE12870-2, AE12870-3, and XW0595. The results of FIG. 3 show that the AE12870-1, AE12870-2, and AE12870-3 materials retain a coating hardness and a low surface roughness similar to the sintered and crushed material alone (AE12368).

Figure 4A:
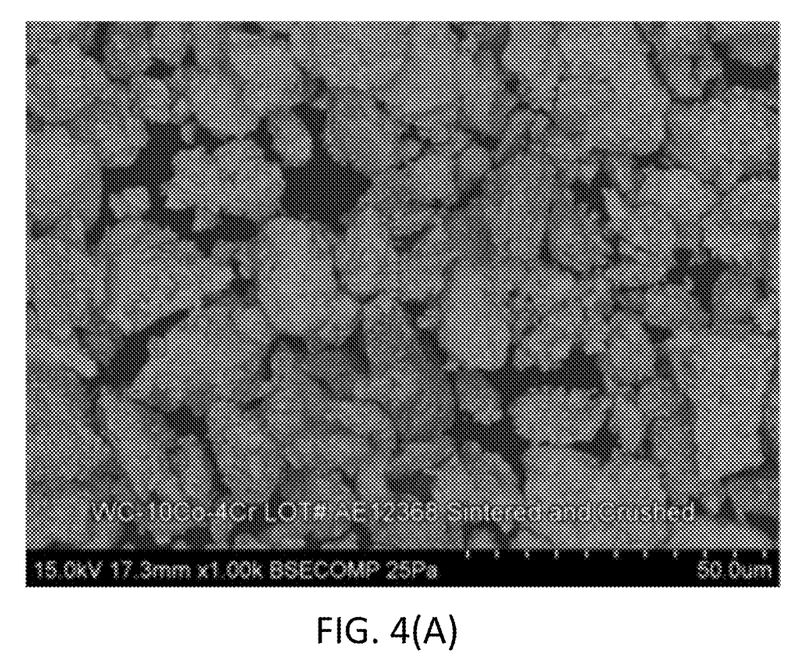
FIG. 4(A) is a SEM image showing dense, fine, and angular particles that have been sintered and crushed.

FIG. 4(A) shows a SEM image of the dense, fine, and angular particles that have been sintered and crushed.

Figure 4B:
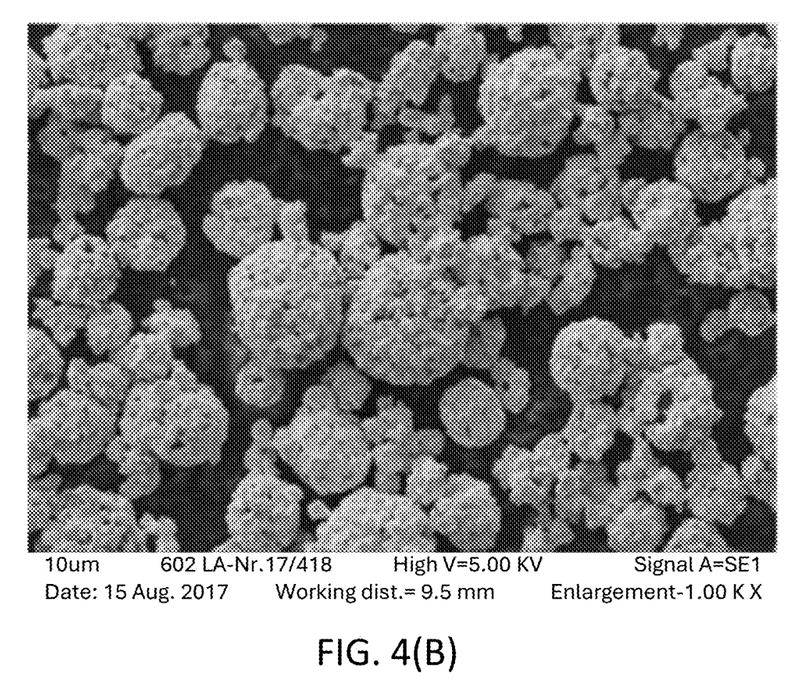
FIG. 4(B) is a SEM image showing spheroidal particles that have been agglomerated and sintered.

FIG. 4(B) shows a SEM image of the spheroidal particles that have been agglomerated and sintered.

Figure 4C:
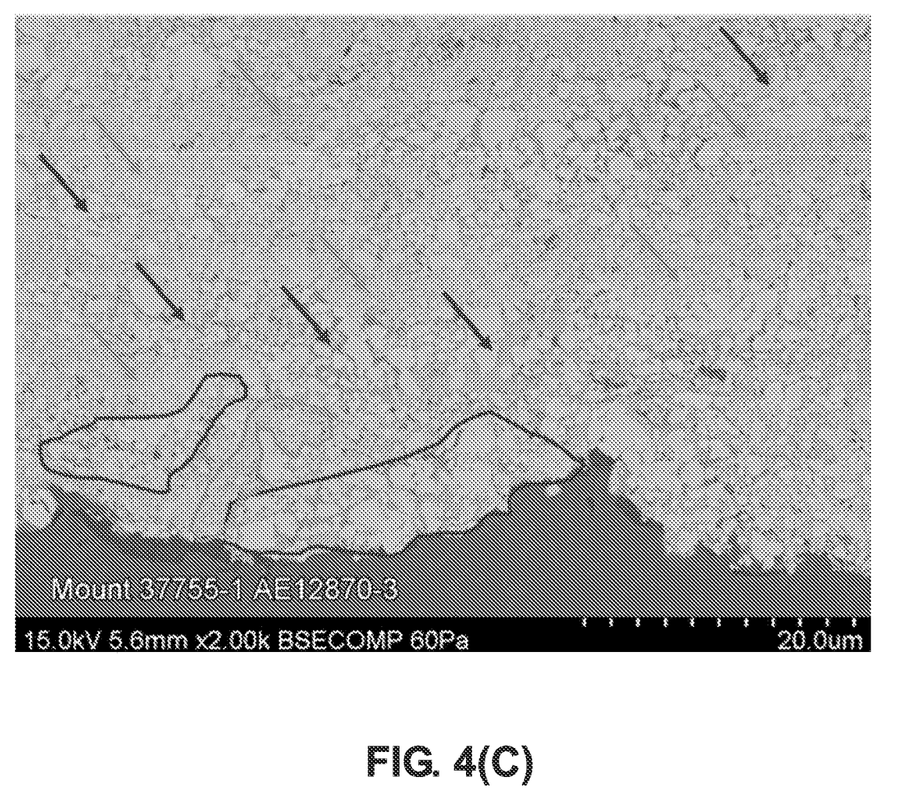
FIG. 4(C) is a SEM image showing a coating structure using a blend ratio of 25% of spheroidal particles that have been agglomerated and sintered and 75% dense, fine, and angular particles that have been sintered and crushed.

FIG. 4(C) shows that the AE12870-3 material provides a coating structure in which the spheroidal particles that have been agglomerated and sintered (lighter shade) deform around the dense, fine, and angular particles that have been sintered and crushed (darker shade).

Figure 5A:
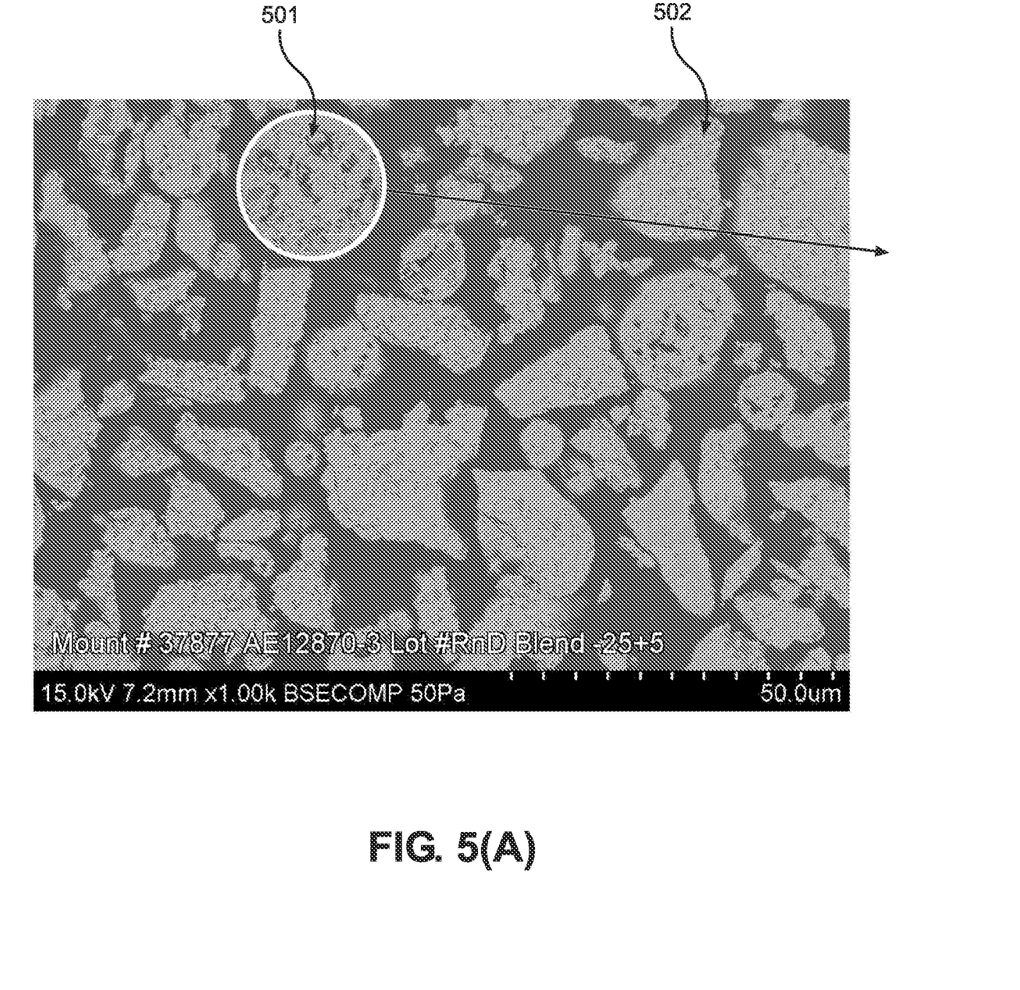
FIG. 5(A) is a lower magnification SEM image of blended feedstock powder showing the conforming versus non-conforming properties of two discrete particle types.

FIG. 5(A) shows a lower magnification SEM image of blended feedstock powder of the conforming versus non-conforming properties of the two particle types. In FIG. 5(A), the lower density, i.e., higher intra-particle porosity, second powder includes a spheroidal second particle 501 and the higher density, i.e., lower intra-particle porosity, first powder includes a first particle 502 having an angular and irregular morphology.

Figure 5B:
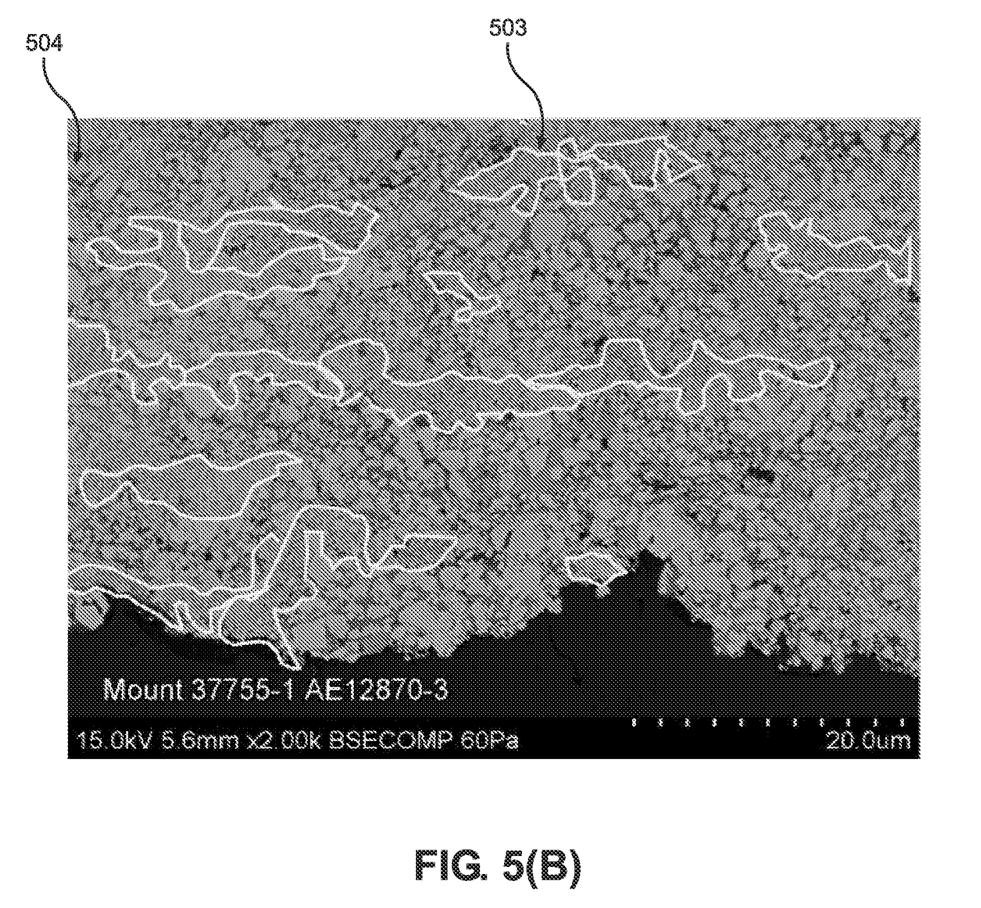
FIG. 5(B) is a higher magnification SEM image of a thermal sprayed coating of the blended powder showing the conforming versus non-conforming properties of two particle types within the coating structure.

FIG. 5(B) shows a higher magnification SEM image of a thermal spray coating from the blended powder of the conforming versus non-conforming properties of the two particle types. A comparison between FIG. 5(A) and FIG. 5(B) shows that the spherical second particle 501 deforms during spray operation to a flatter non-spherical second particle 503. The outlines of the flatter non-spherical second particle 503 depicted in FIG. 5(B) indicate that the spherical second particle 501 has subsequently been deformed. In some embodiments, the spherical second particle 501 has a sphericity of 0.9 or greater prior to spray operation and a sphericity of 0.8 or lower after spray operation.

In contrast, a comparison between FIG. 5(A) and FIG. 5(B) shows that the first particle 502 retains its shape more than the second particle 502 during spray operation as evidenced by the angular and irregular morphology of the after-spray operation first particle 504 in FIG. 5(B).

Considering the data in its entirety, it can be appreciated that the blend powders using 20% to 30% spheroidal particles that have been agglomerated and sintered provide superior and unexpected results in a combination of performance criteria. For instance, the results in FIG. 2 demonstrate that the AE12870-3 material achieves an improved deposition efficiency of from 18.9% to 31.6%, which is a 67% increase. In addition, the results in FIG. 1 demonstrate that the AE12870-3 material achieves an actual increase in abrasion and cavitation resistance. Finally, the results in FIG. 3 show that the AE12870-3 material yields the lowest As-sprayed surface roughness (Ra).

Further, at least because the invention is disclosed herein in a manner that enables one to make and use it, by virtue of the disclosure of particular exemplary embodiments, such as for simplicity or efficiency, for example, the invention can be practiced in the absence of any additional element or additional structure that is not specifically disclosed herein.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A thermal spray material feedstock, comprising:
   (a) a first powder comprising first particles having a dense and angular morphology and an average measurable intra-particle porosity of 0% to 15%; and
   (b) a second powder comprising second particles having an average measurable intra-particle porosity of 5% to 35%, wherein the second powder has a predominantly spheroidal morphology.

2. The thermal spray material feedstock of claim 1, comprising a blend ratio of 5% to 50% of the second powder and 95% to 50% of the first powder, respectively.

3. The thermal spray material feedstock of claim 2, wherein the blend ratio is 10% to 40% of the second powder and 90% to 60% of the first powder, respectively.

4. The thermal spray material feedstock of claim 2, wherein the blend ratio is 20% to 35% of the second powder and 80% to 65% of the first powder, respectively.

5. The thermal spray material feedstock of claim 2, wherein the blend ratio is 25% of the second powder and 75% of the first powder.

6. The thermal spray material feedstock of claim 1, wherein the first particles are sintered and crushed.

7. The thermal spray material feedstock of claim 6, wherein the first particles comprise WC—CoCr powder, carbides, or other hard phases in a metallic matrix, wherein, in the metallic matrix, the other hard phases comprise at least one carbide of elements from the periodic system of elements in groups IV, V, and VI, at least one boride of elements from the periodic system of elements from the periodic system of elements in groups IV, V, and VI, or at least one alloyed carbide or boride of at least two elements from the periodic system of elements in groups IV, V, and VI.

8. The thermal spray material feedstock of claim 7, wherein the carbides are selected from the group consisting of WC, TiC, $Cr_3C_2$ and VC, and the metallic matrix has an alloy composition containing Co, Cr, Ni, Fe or Cu.

9. The thermal spray material feedstock of claim 1, wherein the second particles are agglomerated and sintered.

10. The thermal spray material feedstock of claim 9, wherein the second particles comprise WC—CoCr powder, carbides, or other hard phases in a metallic matrix, wherein, in the metallic matrix, the other hard phases comprise at least one carbide of elements from the periodic system of elements in groups IV, V, and VI, at least one boride of elements from the periodic system of elements in groups IV, V, and VI, or at least one alloyed carbide or boride of at least two elements from the periodic system of elements in groups IV, V, and VI.

11. The thermal spray material feedstock of claim 10, wherein the carbides are selected from the group consisting of WC, TiC, $Cr_3C_2$ and VC, and the metallic matrix has an alloy composition containing Co, Cr, Ni, Fe or Cu.

12. The thermal spray material feedstock of claim 10, wherein the first particles comprise the carbides, and the carbides have a primary average carbide size greater than 1 μm.

13. The thermal spray material feedstock of claim 9, wherein the second particles comprises $Al_2O_3$.

14. The thermal spray material feedstock of claim 9, wherein the second particles comprises carbides and nitrides of Si.

15. The thermal spray material feedstock of claim 9, wherein the second particles comprise the carbides, and the carbides have a primary average carbide size less than 1 μm.

16. The thermal spray material feedstock of claim 1, wherein the first powder and second powder are blended to achieve a deposition efficiency of more than 20%.

17. The thermal spray material feedstock of claim 1, wherein the first powder and second powder are blended to achieve a deposition efficiency of 20% to 50%.

18. The thermal spray material feedstock of claim 1, wherein the first powder and second powder are blended to achieve a deposition efficiency of 30% to 50%.

19. The thermal spray material feedstock of claim 1, wherein the first particles have an average intra-particle porosity of 0% to 15% and the second particles have an average intra-particle porosity of 10% to 35%.

20. The thermal spray material feedstock of claim 1, wherein the first powder comprising the first particles have an average measurable intra-particle porosity of 0.01% to 15%.

21. A method for manufacturing a flash-carbide coating comprising:
thermal spraying the material feedstock of claim 1 onto a substrate surface to form a coating.

22. The method according to claim 21, wherein the thermal spraying process is performed by high-velocity air-fuel (HVAF) or high-velocity oxy-fuel (HVOF).

23. A flash carbide coating obtained from the thermal spray material according to claim 1.

\* \* \* \* \*